United States Patent
Koga et al.

[15] 3,671,543

[45] June 20, 1972

[54] IMIDOMETHYL DERIVATIVES OF 1,3,3-TRIMETHYLINDOLINO-SPIROPYRAN

[72] Inventors: Koichi Koga, Toyonaka; Minoru Hatori, Takarazuka; Takashi Akamatsu, Ashiya, all of Japan

[73] Assignee: Sumitomo Chemical Company, Ltd., Higashi-ku, Osaka, Japan

[22] Filed: May 28, 1970

[21] Appl. No.: 41,584

[52] U.S. Cl. ..................260/326 D, 117/36.8, 260/281, 260/326 N, 260/326.11, 282/28
[51] Int. Cl. ............................................C07d 27/38
[58] Field of Search..................260/326 D, 326 N

[56] References Cited

UNITED STATES PATENTS 3,100,778 8/1963 Berman........................260/326.11

Primary Examiner—Henry R. Jiles
Assistant Examiner—Joseph A. Narcavage
Attorney—Stevens, Davis, Miller & Mosher

[57] ABSTRACT

Novel imidomethyl or amidomethyl derivatives of 1,3,3-trimethylindolino-spiropyran are produced by reacting a 1,3,3-trimethylindolino-spiropyran derivative with an imidomethylating or amidomethylating agent in the presence of a condensing agent and optionally in a solvent. These novel compounds are adapted to be used as a coloring matter for pressure sensitive copy papers and particularly as one component of a coloring matter for black pressure sensitive copy papers.

11 Claims, No Drawings

IMIDOMETHYL DERIVATIVES OF 1,3,3-TRIMETHYLINDOLINO-SPIROPYRAN

The present invention relates to novel imidomethyl or amidomethyl derivatives of 1,3,3-trimethylindolino-benzospiropyran (I) or 1,3,3-trimethylindolino-β-naphthospiropyran (II) represented by the general formula,

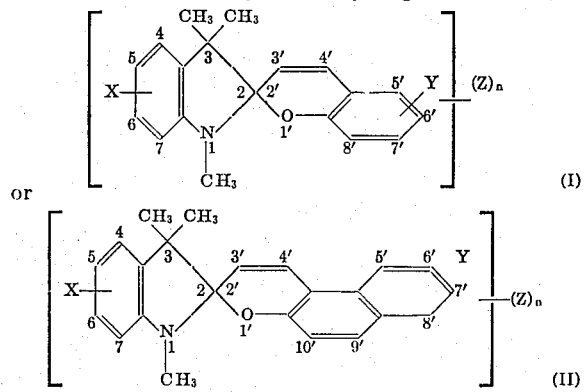

wherein X and Y represent hydrogen atoms; halogen atoms such as chlorine and bromine atoms; lower alkyl groups such as methyl, ethyl, propyl and butyl groups; lower alkoxy groups such as methoxy and ethoxy groups; phenyl groups; phenoxy groups; benzyl groups or nitro groups; Z represents phthalimidomethyl or a substituted phthalimidomethyl group; maleimidomethyl or a substituted maleimidomethyl group; succinimidomethyl or a substituted succinimidomethyl group; tetrahydrophthalimidomethyl or a substituted tetrahydrophthalimidomethyl group; glutarimidomethyl or a substituted glutarimidomethyl group; or glutaconimidomethyl or a substituted glutaconimidomethyl group (the substituents being amino, nitro, hydroxyl or alkyl groups or halogen atoms) or a group of —CH$_2$NHCOR wherein R represents hydrogen atom or an alkyl, an alkenyl, an alkynyl, phenyl or a substituted phenyl, benzyl or a substituted benzyl, or phenethyl or a substituted phenethyl group (the substituents being amino, nitro, hydroxyl, alkyl or alkoxy groups or halogen atoms), and $n$ is 1 to 2.

The present invention also relates to a process for producing these derivatives and pressure sensitive copy papers using these derivatives as pressure sensitive coloring matters.

In the present invention, the alkyl, alkoxy, alkenyl and alkynyl mean those having up to five carbon atoms.

Recently so-called no carbon papers or pressure sensitive copy papers have appeared on the market. Previous oily carbon papers have defects that, for example, they must be placed between slips and that they are apt to stain clothes or hands. Pressure sensitive copy papers have been noted as copy papers which obviate the defects and make a contribution to the speed-up of office work.

The coloring matters of the present invention show a shade from yellow to red after color development, and may be used not only as materials for red pressure sensitive copy papers but also as one component of the materials for black pressure sensitive copy papers. The black pressure sensitive copy papers are characterized in that the type-written copy papers can be further easily reproduced in contrast with blue pressure sensitive papers.

Thus, the imidomethyl- or amidomethyl-1,3,3-trimethylindolino-spiropyran compounds (I) and (II) according to the present invention may be one component of the coloring matters for black pressure sensitive copy papers. When they are used alone, they show visible absorption at 450 – 500 μ (in glacial acetic acid) and are developed into a shade from yellow to red.

The imidomethyl- or amidomethyl-1,3,3-trimethylindolino-spiropyran derivatives are applied onto the back of paper alone or in admixture with other suitable coloring matters for pressure sensitive copy papers, and an acid electron adsorbing material such as kaoline or bentonite is applied onto the surface of other paper. If such papers are put upon each other and pressure or shock is applied by pencil or typewriter, both materials are contacted with each other and the colorless coloring matters are developed to give a colored image.

The compounds of the present invention represented by the formulas (I) and (II) are very rapid in development and give an image of yellow to red having a high density and may be advantageously used in the blending of coloring matters owing to their broad width of visible absorption.

Thus, the present invention is to provide the imidomethyl or amidomethyl derivative of 1,3,3-trimethylindolino-spiropyran represented by the formula (I) and (II), and a process for the production of the same which comprises reacting 1,3,3-trimethylindolino-spiropyran represented by the formula,

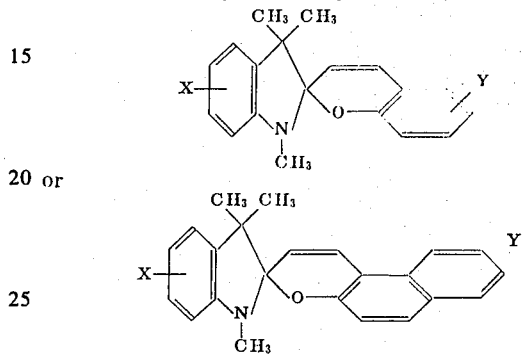

wherein X and Y are as defined above, with an imidomethylating or amidomethylating agent in the presence of a condensing agent.

The present invention is also to provide pressure sensitive copy papers prepared by using the same.

The 1,3,3,-indolino-spiropyran may be synthesized as follows:

1,3,3-Trimethyl-2-methyleneindoline (Fischer's base) (III) and a 2-naphthol-1-aldehyde derivative (IV) or a salicylaldehyde derivative (V) are heated and stirred in an organic solvent to effect dehydration condensation. Thus, 1,3,3-trimethylindolino-β-naphtho-spiropyran derivatives (VI) and 1,3,3-trimethylindolino-benzo-spiropyran derivatives (VII) are respectively obtained. The reaction is shown by the following formulas:

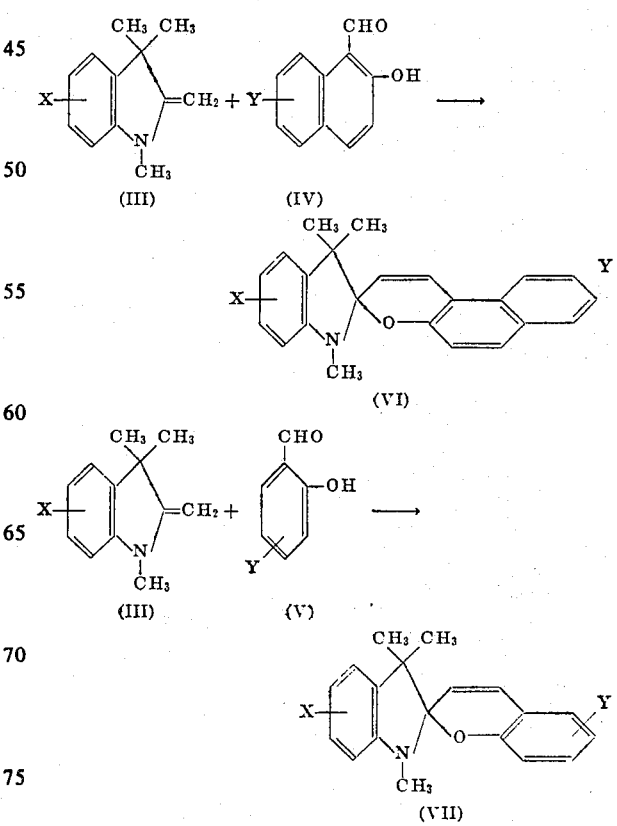

In the above formulas, X and Y are as defined above.

Preferred organic solvents include alcohols such as methanol, ethanol and ethylene glycol; ethers such as dimethyl ether and dioxane; aromatic hydrocarbons such as benzene and toluene; and dimethylformamide and dimethyl sulfoxide.

The imidomethyl- and amidomethyl-1,3,3-trimethylindolino-spiropyran (I) and (II) of the present invention may be easily produced by imidomethylating or amidomethylating the above-mentioned 1,3,3-trimethylindolino-$\beta$-naphthospiropyran (VI) and 1,3,3-trimethylindolino-benzospiropyran (VII), respectively, in the presence of a condensing agent, if necessary in a solvent as shown in the following formulas:

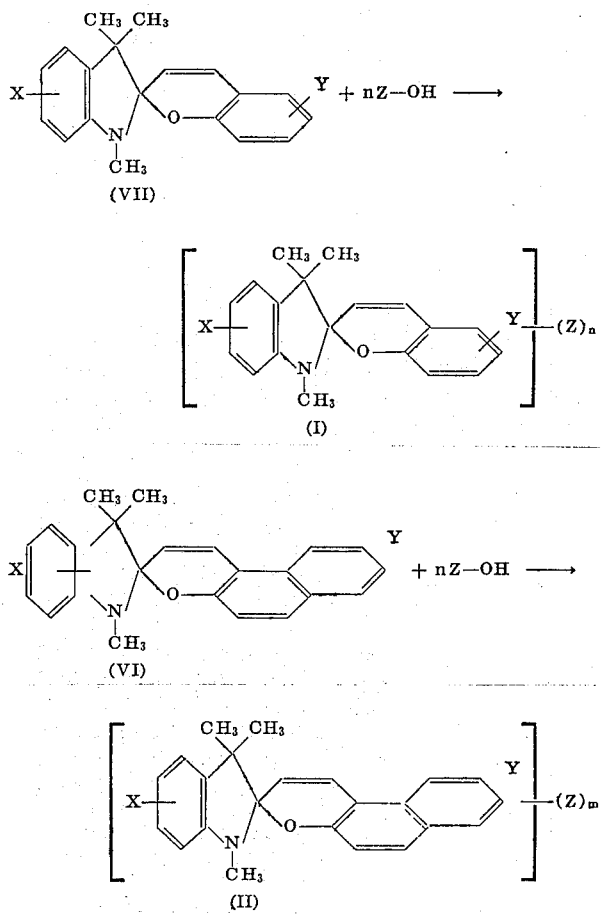

In the above formulas, X, Y, n and Z are as defined above.

The exemplary dicarboxyimide derivatives which may be used as an imidomethylating agent in the present invention include
N-methylol-phthalimide,
N-methylol-3-nitrophthalimide,
N-methylol-4-nitrophthalimide,
N-methylol-3-chlorophthalimide,
N-methylol-4-chlorophthalimide,
N-methylol-3,4-dichlorophthalimide,
N-methylol-4,5-dichlorophthalimide,
N-methylol-3,5-dichlorophthalimide,
N-methylol-3,6-dichlorophthalimide,
N-methylol-4,5-dibromophthalimide,
N-methylol-3,4-dibromophthalimide,
N-methylol-2,3-dibromophthalimide,
N-methylol-3-methylphthalimide,
N-methylol-4-methylphthalimide,
N-methylol-3-methoxyphthalimide,
N-methylol-4-methoxyphthalimide,
N-methylol-3aminophthalimide,
N-methylol-4-aminophthalimide,
N-methylol-3-hydroxyphthalimide,
N-methylol-4-hydroxyphthalimide,
N-methylol-3,4-dihydroxyphthalimide,
N-methylol-3,5-dihydroxyphthalimide,
N-methylol-3,6-dihydroxyphthalimide,
N-methylol-4,5-dihydroxyphthalimide,
N-methylol-3,4-dimethylphthalimide,
N-methylol-3,5-dimethylphthalimide,
N-methylol-3,6-dimethylphthalimide,
N-methylol-4,5-dimethylphthalimide,
N-methylol-3,4-dimethoxyphthalimide,
N-methylol-3,5-dimethoxyphthalimide,
N-methylol-3,6-dimethoxyphthalimide,
N-methylol-4,5-dimethoxyphthalimide,
N-methylol-3,4-diaminophthalimide,
N-methylol-3,5-diaminophthalimide,
N-methylol-3,6-diaminophthalimide,
N-methylol-4,5-diaminophthalimide,
N-methylol-3,4,5,6-tetrahydrophthalimide,
N-methylol-1,2,3,4-tetrahydrophthalimide,
N-methylol-maleimide,
N-methylol-dimethylmaleimide,
N-methylol-methylethylmaleimide,
N-methylol-methylpropylmaleimide,
N-methylol-succinimide,
N-methylol-2-phenylsuccinimide,
N-methylol-glutarimide and
N-methylol-glutaconimide.

Also, in addition to such N-methylol compounds of dicarboxyimides, N-halomethyl compounds may be used as an imidomethylating agent. These compounds can be easily obtained either by reacting the corresponding dicarboxyimides with formaldehyde to produce N-methylol compounds according to a usual method or by further reacting the N-methylol compounds thus obtained with a dihalomethyl ether to produce N-halomethyl derivatives.

As the amidomethylating agent, N-methylolamide, N-chloromethylamides and N-bromomethylamides can be used which are represented by the formulas, $RCONHCH_2OH$, $RCONHCH_2Cl$ or $RCONHCH_2Br$ wherein R is as defined above.

The N-methylolamides which may be used as an amidomethylating agent in the present invention include, for example,
N-methylol-formamide
N-methylol-acetamide
N-methylol-chloracetamide
N-methylol-trichloracetamide
N-methylol-phenylacetamide
N-methylol-2-phenyl-propionamide
N-methylol-isovaleramide
N-methylol-benzamide
N-methylol-o-nitrobenzamide
N-methylol-m-nitrobenzamide
N-methylol-p-nitrobenzamide
N-methylol-o-hydroxy-benzamide
N-methylol-m-hydroxy-benzamide
N-methylol-p-hydroxy-benzamide
N-methylol-p-methyl-benzamide
N-methylol-o-methyl-benzamide
N-methylol-m-methyl-benzamide
N-methylol-acrylamide
N-methylol-crotonamide
N-methylol-propiolamide
N-methylol-cinnamamide
N-methylol-$\alpha$-methylacrylamide
N-methylol-o-methoxybenzamide
N-methylol-m-methoxybenzamide
N-methylol-p-methoxybenzamide
N-methylol-o-chlorobenzamide
N-methylol-m-chlorobenzamide
N-methylol-p-chlorobenzamide
N-methylol-(o-chlorophenyl) acetamide
N-methylol-(m-chlorophenyl) acetamide
N-methylol-(p-chlorophenyl) acetamide N-methylol-(o-nitrophenyl) acetamide
N-methylol-(m-nitrophenyl) acetamide
N-methylol-(p-nitrophenyl) acetamide
N-methylol-(o-methoxyphenyl) acetamide
N-methylol-(m-methoxyphenyl) acetamide
N-methylol-(p-methoxyphenyl) acetamide
N-methylol-2-(o-chlorophenyl)-propionamide
N-methylol-2-(m-chlorophenyl) propionamide
N-methylol-2-(p-chlorophenyl) propionamide
N-methylol-2-(o-methoxyphenyl) propionamide
N-methylol-2-(m-methoxyphenyl) propionamide
N-methylol-2-(p-methoxyphenyl) propionamide
N-methylol-2-(o-hydroxyphenyl) propionamide
N-methylol-2-(m-hydroxyphenyl) propionamide
N-methylol-2-(p-hydroxyphenyl) propionamide
N-methylol-2-(o-nitrophenyl) propionamide
N-methylol-2-(m-nitrophenyl) propionamide
N-methylol-2-(p-nitrophenyl) propionamide These amidomethylating agents can be easily obtained either by reacting the corresponding amides with formaldehyde to produce N-methylol compounds or by N-halomethylating the amides with a dihalomethyl ether according to a usual method.

The condensing agents include sulfuric acid, hydrochloric acid, phsphoric acid, boron trifluoride, zinc chloride, aluminum chloride, hydrogen fluoride, phosphorus pentoxide, phosphorus pentachloride, phosphorus oxychloride and formic acid.

As for the reaction solvents, condensing agents such as sulfuric acid may also act as a solvent. However, halogen-substituted aromatic hydrocarbons such as chlorobenzene and dichlorobenzene; aliphatic and alicyclic hydrocarbons such as hexane and cyclohexane; halogenated aliphatic hydrocarbons such as chloroethane and dichloroethane; ethers such as ether and dioxane; nitrobenzene and carbon disulfide may be used as reaction solvent.

The starting 1,3,3-trimethylindolino-β-naphtho-spiropyran derivative (VI) or 1,3,3-trimethylindolino-benzo-spiropyran derivative (VII) is mixed with a condensing agent if necessary in a solvent and the imidomethylating or amidomethylating agent is then added thereto in a molar ratio of 1.0 to 2.5.

The reaction temperature and the reaction time depend upon the starting materials. The desired compound (I) or (II) can be obtained by heating the reaction mixture at 0° to 150° C. for several hours, sometimes for 20 to 90 hours.

All of the thus obtained compounds (I) and (II) are new compounds and soluble in a variety of organic solvents such as, for example, benzene, xylene, chlorinated biphenyl and the like. If the solution is contacted with kaolin, bentonite, acid clay or the like inorganic compound, a brilliant shade from yellow to red is produced and the shade is highly stable to air and light. Thus, such characteristics may be suitable for a coloring matter for pressure sensitive copy papers.

Previously known 1,3,3-trimethylindolino-benzo-spiropyran and 1,3,3-trimethylindolino-β-naphtho-spiropyran derivatives may be used in pressure sensitive copy papers, but they had a defect that they are poor in fastness to sublimation although their development speed is large and they give a shade of yellowish orange to red. Therefore, the yellowish orange to red image is apt to migrate to the surface of other paper and stain the surface.

The compounds of the present invention are novel ones which have obviated the defect and have been remarkably improved with respect to their sublimableness. Therefore, practically valuable pressure sensitive copy papers can be produced by the use of the compounds.

Pressure sensitive copy papers may be prepared by using at least one compounds represented by the formulas (I) and (II) according to the conventional method disclosed in many patents and the other literature references. For example, the above-mentioned imidomethyl- or amidomethyl-1,3,3-trimethylindolino-spiropyran compound (I) or (II) is dissolved in a non-volatile and nonpolar solvent such as chlorobiphenyl, mineral oil, paraffin oil or olive oil.

The solution is added to an aqueous gelatin solution with vigorous stirring to disperse as oil drops 1 - 10 microns in size. The aqueous gum arabic solution is added to the above obtained emulsion, and the whole solution is coacervated with the pH adjustment or the dilution. The oil drops coated by the coacervate are solidified with alums or aldehydes such as formalin and glutaraldehyde.

The microcapsules can be isolated by filtration, decantation, or centrifuge filtration.

The microcapsules thus obtained is applied onto paper and then dried to obtain pressure sensitive copy paper.

The thus obtained pressure sensitive copy papers are improved in fastness to sublimation. Therefore, the compounds of the present invention are useful as an orange coloring matter for pressure sensitive copy papers, because the conventional orange coloring matters have been used with inferior fastness to sublimation.

Also, the compounds of the present invention are highly adapted to one component of a black coloring material for pressure sensitive copy papers because, as described above, they are rapid to develop and give a shade having a high density and show a broad width of visible absorption.

The following examples are illustrative only of this invention and should not be construed as limiting the scope thereof, which is properly delineated in the appended claims.

EXAMPLE 1

To 60 grams of 89 percent sulfuric acid, 4.9 grams (0.015 mol) of 1,3,3-trimethylindolino-β-naphtho-spiropyran was added at 8° to 14° C. Then, 4.21 grams (0.023 mol) of N-methylol-phthalimide was added at the same temperature. The reaction mixture was kept at 20° to 25° C for 48 hours. The progress of the reaction was observed by the thin layer chromatography (hereinafter referred to as T.L.C.) of a sample taken from the mixture. The mixture was then discharged into 1,000 cc of water. The solution was neutralized with a 10 percent caustic soda solution to separate crystals.

The crystals were recovered by filtration and washed with water to obtain 7.5 grams of a coloring matter which has the following formula, and which has a visible absorption spectrum $\lambda_{max}$ = 482 m$\mu$ (in glacial acetic acid). The coloring matter was improved with respect to its sublimation resistance. Thus, it was far less sublimable than the starting 1,3,3-trimethylindolino-β-naphthospiropyran.

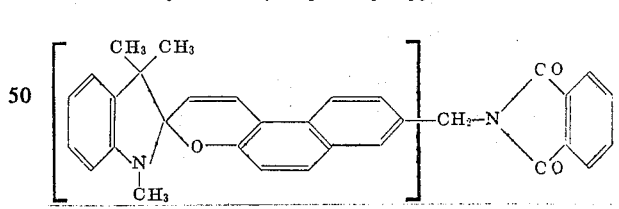

EXAMPLE 2

To 70 grams of 70 percent sulfuric acid 3.2 grams (0.01 mol) of 1,3,3-trimethylindolino-β-naphtho-spiropyran was added at 0° to 5° C. Then, 2.0 grams (0.011 mol) of N-methylol-3,4,5,6-tetrahydrophthalimide was added at the same temperature. The reaction mixture was kept at 20° to 25° C. for 48 hours. The progress of the reaction was observed by the T.L.C. of a sample taken from the mixture. The mixture was then discharged into 1,000 cc of water. The solution was neutralized with a 10 percent caustic soda solution to separate crystals.

The crystals were recovered by filtration and washed with water to obtain 6.1 grams of a coloring matter having a visible absorption spectrum $\lambda_{max}$ = 482 m$\mu$ (in glacial acetic acid).

EXAMPLE 3

To 100 grams of 70 percent sulfuric acid 6.5 grams (0.02 mol) of 1,3,3-trimethylindolino-β-naphtho-spiropyran was added at 0° to 5° C. Then, 2.6 grams (0.02 mol) of N-methylol-succinimide was added at the same temperature. The reaction was kept at 20° to 25° C for 48 hours. The progress of the reaction was observed by the T.L.C. of a sample taken from the mixture. The mixture was then discharged into 1,000 cc of water. The solution was neutralized with a 10 percent caustic soda solution to separate crystals.

The crystals were recovered by filtration and washed with water to obtain 6.0 grams of a coloring matter having a visible absorption spectrum $\lambda_{max} = 483$ m$\mu$ (in glacial acetic acid).

EXAMPLE 4

To 25 grams of 70 percent sulfuric acid 1.1 grams (0.025 mol) of 1,3,3-trimethyl-5-chloro-indolino-7'-bromo-$\beta$-naphtho-spiropyran was added at 0° to 5° C. Then, 0.67 gram (0.025 mol × 1.5) of N-methylolphthalimide was added at the same temperature. The reaction mixture was kept at 20° to 25° C for 48 hours. The progress of the reaction was observed by the T.L.C. of a sample taken from the mixture. The mixture was then discharged into 1,000 cc of water. The solution was neutralized with a 10 percent caustic soda solution to separate crystals.

The crystals were recovered by filtration and washed with water to obtain 1.3 grams of a coloring matter having a visible absorption spectrum $\lambda_{max} = 487$ m$\mu$ (in glacial acetic acid).

EXAMPLE 5

To 25 grams of 70 percent sulfuric acid 1.0 grm (0.025 mol) of 1,3,3-trimethylindolino-7'-bromo-$\beta$-naphtho-spiropyran was added at 0° to 5° C. Then, 0.67 gram of N-methylolphthalimide was added at the same temperature. The reaction mixture was kept at 20° to 25° C. for 50 hours. The progress of the reaction was observed by the T.L.C. of a sample taken from the mixture. The mixture was discharged into 1,000 cc of water. The solution was neutralized with a 10 percent caustic soda solution to separate crystals.

The crystals were recovered by filtration and washed with water to obtain 1.0 gram of a coloring matter having a visible absorption spectrum $\lambda_{max} = 478$ m$\mu$ (in glacial acetic acid).

EXAMPLE 6

To 25 grams of 70 percent sulfuric acid 0.6 gram of 1,3,3-trimethyl-5-chloro-indolino-$\beta$-naphtho-spiropyran was added at 0° to 5° C. Then, 0.4 gram of N-methylol-3,4,5,6-tetrahydrophthalimide was added at the same temperature. The reaction mixture was allowed to stand overnight at 20° to 25° C. The progress of the reaction was observed by the T.L.C. of a sample taken from the mixture. The mixture was discharged into 1,000 cc of water. The solution was neutralized with a 10 percent caustic soda solution to separate crystals.

The crystals were recovered by filtration and washed with water to obtain 0.9 gram of a coloring matter having a visible absorption spectrum $\lambda_{max} = 487$ m$\mu$ (in glacial acetic acid).

EXAMPLE 7

To 50 grams of 70 percent sulfuric acid 3.61 grams (0.01 mol) of 1,3,3-trimethyl-5-chloro-indolino-$\beta$-naphtho-spiropyran was added at 0° to 5° C. Then, 3.1 grams (0.015 mol) of N-methylol-4-methoxyphthalimide was added at the same temperature. The reaction mixture was allowed to stand overnight at 20° to 25° C. The progress of the reaction was observed by the T.L.C. of a sample taken from the mixture. The mixture was then discharged into 1,000 cc of water. The solution was neutralized with a 10 percent caustic soda solution to separate crystals. The crystals were recovered by filtration and washed with water to obtain 6.2 grams of a coloring matter.

EXAMPLE 8

To 50 grams of 70 percent sulfuric acid 3.3 grams (0.01 mol) of 1,3,3-trimethylindolino-$\beta$-naphtho-spiropyran was added to 0° to 5° C. Then, 3,2 grams (0.015 mol) of N-methylol-4-chlorophthalimide was added at the same temperature. The reaction mixture was allowed to stand overnight at 20° to 25° C. The progress of the reaction was observed by the T.L.C. of a sample taken from the mixture. The mixture was then discharged into 1,000 cc of water. The solution was neutralized with a 10 percent caustic soda solution to separate crystals. The crystals were recovered by filtration and washed with water to obtain 5.9 grams of a coloring matter.

EXAMPLE 9

To 50 grams of 70 percent sulfuric acid 4.50 grams (0.01 mol) of 1,3,3-trimethyl-5-nitro-indolino-7'-bromo-$\beta$-naphtho-spiropyran was added at 0° to 5° C. Then, 3.33 grams (0.015 mol) of N-methylol-3-nitrophthalimide was added at the same temperature. The reaction mixture was allowed to stand overnight at 20° to 25° C. The progress of the reaction was observed by the T.L.C. of a sample taken from the mixture. The mixture was discharged into 1,000 cc of water. The solution was neutralized with a 10 percent caustic soda solution to separate crystals. The crystals were recovered by filtration and washed with water to obtain 6.1 grams of a coloring matter.

EXAMPLE 10

To 50 grams of 70 percent sulfuric acid 4.36 grams (0.01 mol) of 1,3,3-trimethyl-5-methoxy-indolino-7'-bromo-$\beta$-naphtho-spiropyran was added at 0° to 5° C. Then, 1.9 grams (0.015 mol) of N-methylolmaleinimide was added at the same temperature. The reaction mixture was allowed to stand overnight at 20° to 25° C. The rpgress of the reaction was observed by the T.L.C. of a sample taken from the mixture. The mixture was discharged into 1,000 cc of water. The solution was neutralized with a 10 percent caustic soda solution to separate crystals. The crystals were recovered by filtration and washed with water to obtain 6.3 grams of a coloring matter having a visible absorption spectrum $\lambda_{max} = 483$ m$\mu$ (in glacial acetic acid).

EXAMPLE 11

Coloring matters similar to that of Example 1 were obtained by using 1,3,3-trimethyl-5-phenyl-indolino-$\beta$-naphtho-spiropyran, 1,3,3-trimethyl-7-phenyl-indolino-7'-bromo-$\beta$-naphtho-spiropyran, 1,3,3-trimethyl-5-phenoxy-indolino-$\beta$-naphtho-spiropyran, 1,3,3,5-tetramethyl-idolino-$\beta$-naphtho-spiropyran and 1,3,3,7-tetramethyl-indolino-7'-bromo-$\beta$-naphtho-spiropyran in place of 1,3,3-trimethyl-indolino-$\beta$-naphtho-spiropyran, and using N-methylol-3-methylphthalimide, N-methylol-4-nitrophthalimide, N-chloromethyl-3-nitrophthalimide, N-bromomethyl-4-methylphthalimide, N-methylol-4-chloro-phthalimide, N-methylol-4,5-dibromophthalimide, N-methylol-4,5-dichlorophthalimide, N-methylol-3-methoxy-phthalimide, N-methylol-3-aminophthalimide, N-methylol-1,2,3,6-tetrahydrophthalimide, N-methylol-dimethylmaleinimide, N-methylol-methylethyl-maleinimide and N-methylol-2-phenylsuccinimide in place of N-methylolphthalimide in Example 1.

EXAMPLE 12

To 100 grams of anhydrous dioxane 20.3 grams (0.1 mol) of 5-methoxy-1,3,3-trimethyl-indolino-$\beta$-naphtho-spiropyran and 5 grams of anhydrous zinc chloride were added. Then, 36.0 grams (0.15 mol) of N-bromomethyl-phthalimide was added. The reaction mixture was warmed at 80° C. for about 3 hours. The progress of the reaction was observed by the T.L.C. of a sample taken from the mixture. The mixture was discharged into 2,000 cc of water. The separated crystals were recovered by filtration, washed with water, washed with a 10 percent aqueous sodium bicarbonate solution and washed with water to obtain 45 grams of a coloring matter.

EXAMPLE 13

Similar coloring matters were obtained by using N-chloromethyl-3-methylphthalimide, N-bromomethyl-4-nitrophthalimide, N-chloromethyl-succinimide and N-bromomethyl-maleinimide in place of N-bromomethyl-phthalimide, and using 1,3,3-trimethyl-7-phenyl-indolino-β-naphtho-spiropyran, 1,3,3-trimethyl-7-methoxy-indolino-β-naphtho-spiropyran and 1,3,3,5-tetramethyl-indolino-7'-chloro-β-naphtho-spiropyran in place of 1,3,3-trimethyl-5-methoxy-indolino-β-naphtho-spiropyran in Example 12.

EXAMPLE 14

To 100 grams of 70 percent sulfuric acid 3.57 grams (0.01 mol) of 1,3,3-trimethyl-5-methoxy-indolino-β-naphtho-spiropyran was added at 0° to 5° C. Then, 4.0 grams (0.022 mol) of N-methylol-3,4,5,6tetrahydrophthalimide was added at the same temperature. The reaction mixture was allowed to stand overnight at 20° to 25° C. The progress of the reaction was observed by the T.L.C. of a sample taken from the mixture. The mixture was discharged into 2,000 cc of water. The solution was neutralized with a 10 percent caustic soda solution to separate crystals. The crystals were recovered by filtration and washed with water to obtain 7.2 grams of bis(3,4,5,6-tetrahydrophthalimidomethyl)-1,3,3-trimethyl-5-methoxy-indolino-β-naphtho-spiropyran ($n = 2$).

EXAMPLE 15

To 100 grams of 70 percent sulfuric acid 5.54 grams (0.02 mol) of 1,3,3-trimethyl-indolino-benzo-spiropyran was added at 0° to 5° C. Then, 5.32 grams (0.02 mol × 1.5) of N-methylol-phthalimide was added at the same temperature. The reaction mixture was warmed at 20° to 25° C for 48 hours. The progress of the reaction was observed by the T.L.C. of a sample taken from the mixture. The mixture was discharged into 1,000 grams of water. The solution was neutralized with a 10 percent caustic soda solution to separate crystals. The crystals were recovered by filtration and washed with water to obtain 8.9 grams of a coloring matter having a visible absorption spectrum $\lambda_{max} = 432$ mμ (in glacial acetic acid).

EXAMPLE 16

To 25 grams of 70 percent sulfuric acid 1.53 grams (5.0 × $10^{-3}$ mol) of 1,3,3-trimethyl-indolino-8 methoxy-benzo-spiropyran was added at 0° to 5° C. Then, 1.0 gram (5.0 × $10^{-3}$ mol × 1.1) of N-methylolphthalimide was added at the same temperature. The reaction mixture was kept at 20° to 25° C. for 48 hours. The progress of the reaction was observed by the T.L.C. of a sample taken from the mixture. The mixture was discharged into 1,000 grams of water. The solution was neutralized with a 10 percent caustic soda solution to separate crystals. The crystals were recovered by filtration and washed with water to obtain 2.3 grams of a coloring matter having a visible absorption spectrum $\lambda_{max} = 400$ mμ (in glacial acetic acid).

EXAMPLE 17

To 25 grams of 70 percent sulfuric acid 1.5 grams (5 × $10^{-3}$ mol) of 1,3,3-trimethyl-5-chloro-indolino-benzo-spiropyran was added at 0° to 5° C. Then, 1.35 grams (5 × $10^{-3}$ mol × 1.5) of N-methylolphthalimide was added at the same temperature. The reaction mixture was kept at 20° to 25° C. for 24 hours. The progress of the reaction was observed by the T.L.C. of a sample taken from the mixture. The mixture was discharged into 500 cc of water. The solution was neutralized with a 10 percent caustic soda solution to separate crystals. The crystals were recovered by filtration and washed with water to obtain 2.4 grams of a coloring matter having a visible absorption spectrum $\lambda_{max} = 438$ mμ.

EXAMPLE 18

To 50 grams of 70 percent sulfuric acid 3.6 grams (0.01 mol) of 1,3,3-trimethyl-indolino-6'-bromo-benzo-spiropyran was added at 0° to 5° C. Then, 1.43 grams (0.011 mol) of N-methylol-succinimide was added at the same temperature. The reaction mixture was kept at 20° to 25° C for 40 hours. The progress of the reaction was observed by the T.L.C. of a sample taken from the mixture. The mixture was discharged into 1,000 grams of water. The solution was neutralized with a 10 percent caustic soda solution to separate crystals. The crystals were recovered by filtration and washed with water to obtain 4.3 grams of a coloring matter.

EXAMPLE 19

To 50 grams of 70 percent sulfuric acid 3.1 grams (0.01 mol) of 1,3,3-trimethyl-7-chloro-indolino-benzo-spiropyran was added at 0° to 5° C. Then, 2.0 grams (0.011 mol) of N-methylol-3,4,5,6-tetrahydro-phthalimide was added at the same temperature. The reaction mixture was allowed to stand overnight at 20° to 25° C. The progress of the reaction was observed by the T.L.C. of a sample taken from the mixture. The mixture was discharged into 1,000 grams of water. The solution was neutralized with a 10 percent caustic soda solution to separate crystals. The crystals were recovered by filtration and washed with water to obtain 4.8 grams of a coloring matter.

EXAMPLE 20

To 100 grams of 70 percent sulfuric acid 3.2 grams (0.011 mol) of 1,3,3,7tetramethyl-indolino-benzo-spiropyran was added at 0° to 5° C. Then, 3.9 grams (0.022 mol) of N-methylophthalimide was added at the same temperature. The reaction mixture was allowed to stand overnight at 20° to 25° C. The progress of the reaction was observed by the T.L.C. of a sample taken from the mixture. The mixture was discharged into 2,000 cc of water. The solution was neutralized with a 10 percent caustic soda solution to separate crystals. The crystals were recovered by filtration and washed with water to obtain 6.7 grams of bis-(phthalimidomethyl)-1,3,3,7-tetramethyl-indolino-benzo-spiropyran ($n = 2$).

EXAMPLE 21

To 50 grams of 70 percent sulfuric acid 3.5 grams (0.01 mol) of 1,3,3-trimethyl-indolino-5'-phenyl-benzo-spiropyran was added at 0° to 50° C. Then, 3.33 grams (0.015 mol) of N-methylol-3-nitrophthalimide was added at the same temperature. The reaction mixture was allowed to stand overnight at 20° to 25° C. The progress of the reaction was observed by the T.L.C. of a sample taken from the mixture. The mixture was discharged into 1,000 grams of water. The solution was neutralized with a 10 percent caustic soda solution to separate crystals. The crystals were recovered by filtration and washed with water to obtain 5.7 grams of a coloring matter.

EXAMPLE 22

Coloring matters similar to that of Example 15 were obtained by using 1,3,3-trimethyl-5-phenyl-indolino-benzo-spiropyran, 1,3,3-trimethyl-7-phenyl-indolino-5'-bromobenzo-spiropyran, 1,3,3-trimethyl-5-phenoxy-indolino-benzo-spiropyran, 1,3,3,5-tetramethyl-indolino-benzo-spiropyran and 1,3,3,7-tetramethyl-indolino-5'-chloro-benzo-spiropyran in place of 1,3,3-trimethylindolinobenzo-spiropyran, and using N-methylol-3-methylphthalimide, N-methylol-4-nitrophthalimide, N-chloromethyl-3-nitrophthalimide, N-bromomethyl-4-methylphthalimide, N-methylol-4-chlorophthalimide, N-methylol-4,5-dibromophthalimide, N-methylol-4.5-dichlorophthalimide, N-methylol-3-methoxyphthalimide, N-methylol-3-aminophthalimide, N-methylol-1,2,3,6-tetrahydrophthalimide, N-methylol-dimethylmaleinimide and N-methylol-2-phenyl-succinimide in place of N-methylol-phthalimide in Example 15.

EXAMPLE 23

To 70 grams of 70 percent sulfuric acid 4.9 grams of 1,3,3-trimethylindolino-β-naphtho-spiropyran was added at 0° to 5° C. Then, 3.0 grams (1.5 molar ratio) of N-methylol-benzamide was added at the same temperature. If it was observed that there were no lumps, the reaction mixture was kept at 20° to 25° C. for 15 hours. The disappearance of the starting materials was confirmed by the T.L.C. of a sample taken from the mixture. The mixture was discharged into 1,000 grams of ice water. The solution was neutralized with 10 percent caustic soda at 20° to 25° C. to separate crystals. The thus separated crystals were recovered by filtration and washed with water to obtain 7.6 grams of a coloring matter having a visible absorption spectrum $\lambda_{max} = 483$ mμ (in glacial acetic acid).

This coloring matter is remarkably superior in sublimation resistance to the starting 1,3,3-trimethylindolino-β-naphtho-spiropyran.

EXAMPLE 24

Into 70 grams of 70 percent sulfuric acid 3.2 grams of 1,3,3-trimethylindolino-β-naphtho-spiropyran was charged at 0° to 5° C. Then, 0.98 gram (1.1 mol) of N-methylol-acetamide was added at the same temperature. The reaction mixture was kept at 20° to 25° C. for 10 hours. The mixture was discharged into 1,000 grams of ice water. The solution was neutralized with a 10 percent caustic soda solution to separate crystals. The crystals were recovered by filtration and washed with water to obtain 6.1 grams of a coloring matter having a visible absorption spectrum $\lambda_{max} = 482$ mμ (in glacial acetic acid).

EXAMPLE 25

To 50 grams of 70 percent sulfuric acid 3.1 grams (0.01 mol) of 1,3,3-trimethylindolino-8'-methoxybenzo-spiropyran was added at 0° to 5° C. Then, 2.2 grams (0.01 × 1.1 mol) of N-methylol-p-nitrobenzamide was added at the same temperature. The reaction mixture was kept at 20° to 25° C. for 48 hours. The mixture was discharged into 1,000 grams of ice water. The solution was neutralized with a 10 percent caustic soda solution to separate crystals. The crystals were recovered by filtration and washed with water to obtain 5.1 grams of a coloring matter having a visible absorption spectrum $\lambda_{max} = 399$ mμ (in glacial acetic acid).

EXAMPLE 26

To 50 grams of 70 percent sulfuric acid 3.1 grams of 1,3,3-trimethyl-7-chloro-indolino-benzo-spiropyran was added at 0° to 5° C. Then, 2.1 grams (1.1 mol) of N-methylol-trichloroacetamide was added at the same temperature. The reaction mixture was allowed to stand overnight at 20° to 25° C. The mixture was discharged into 1,000 grams of ice water. The solution was neutralized with a 10 percent caustic soda solution to separate crystals. The crystals were recovered by filtration and washed with water to obtain 5.0 grams of a coloring matter having a visible absorption spectrum $\lambda_{max} = 439$ mμ (in glacial acetic acid).

EXAMPLE 27

To 100 grams of 70 percent sulfuric acid 4.1 grams of 1,3,3-trimethylindolino-7'-bromo-β-naphtho-spiropyran was added at 0° to 5° C. Then, 3.4 grams (2.5 mols) of N-methylol-benzamide was added at the same temperature. The reaction mixture was allowed to stand overnight at 20° to 25° C. The mixture was discharged into 2,000 grams of ice water. The solution was neutralized with 10 percent caustic soda solution to separate crystals. The crystals were recovered by filtration and washed with water to obtain 6.9 grams of bis-(benzamidomethyl)-1,3,3-trimethylindolino-7'-bromo-β-naphtho-spiropyran.

EXAMPLE 28

Into 70 grams of 70 percent sulfuric acid 3.6 grams of 5-chloro-1,3,3-trimethylindolino-β-naphtho-spiropyran was charged at 0° to 5° C. Then, 1.8 grams (1.1 mol) of N-methylol-p-toluamide was added at the same temperature. The reaction mixture was allowed to stand at 20° to 25° C. for 12 hours. The mixture was discharged into 1,000 grams of ice water. The solution was neutralized with a 10 percent caustic soda solution to separate crystals. The crystals were recovered by filtration and washed with water to obtain 5.1 grams of a coloring matter having a visible absorption spectrum $\lambda_{max} = 493$ mμ (in glacial acetic acid).

EXAMPLE 29

Into 70 grams of 70 percent sulfuric acid 3.8 grams of 5-chloro-1,3,3-trimethylindolino-6'-phenyl-benzo spiropyran was charged at 0° to 5° C. Then, 1.8 grams (1.1 mol) of N-methylol-phenyl-acetamide was added at the same temperature. The reaction mixture was kept at 20° to 25° C. for 10 hours. The mixture was discharged into 1,000 grams of ince water. The solution was neutralized with a 10 percent caustic soda solution to separate crystals. The crystals were recovered by filtration and washed with water to obtain 5.5 grams of a coloring matter having a visible absorption spectrum $\lambda_{max} = 460$ mμ (in glacial acetic acid).

EXAMPLE 30

Coloring matters similar to that of Example 23 were obtained by using 5-methoxy-1,3,3-trimethylindolino-β-naphtho-spiropyran
7-bromo-1,3,3-trimethylindolino-β-naphtho-spiropyran
5-phenyl-1,3,3-trimethylindolino-β-naphtho-spiropyran
1,3,3,5-tetramethylindolino-β-naphtho-spiropyran
1,3,3,7-tetramethylindolino-β-naphtho-spiropyran
1,3,3-trimethylindolino-7'-chloro-β-naphtho-spiropyran
1,3,3-trimethylindolino-7'-methoxy-β-naphtho-spiropyran
1,3,3-trimethylindolino-7'-nitro-β-naphtho-spiropyran
5-methoxy-1,3,3-trimethylindolino-7'-bromo-β-naphtho-spiropyran
5-chloro-1,3,3-trimethylindolino-7'-chloro-β-naphtho-spiropyran
5-bromo-1,3,3-trimethylindolino-7'-bromo-β-naphtho-spiropyran
7-phenyl-1,3,3-trimethylindolino-7'-chloro-β-naphtho-spiropyran
5-methoxy-1,3,3-trimethylindolino-benzo-spiropyran
5-choro-1,3,3-trimethylindolino-benzo-spiropyran
7-chloro-1,3,3-trimethylindolino-benzo-spiropyran
5-bromo-1,3,3-trimethylindolino-benzo-spiropyran
7-phenyl-1,3,3-trimethylindolino-benzo-spiropyran
1,3,3,5-tetramethylindolino-benzo-spiropyran
1,3,3,7-tetramethylindolino-benzo-spiropyran
1,3,3-trimethylindolino-6'-bromo-benzo-spiropyran
1,3,3-trimethylindolino-6'-methoxy-benzo-spiropyran
1,3,3-trimethylindolino-6'-nitro-benzo-spiropyran
1,3,3-trimethylindolino-6'-chloro-benzo-spiropyran
1,3,3-trimethylindolino-8'-chloro-benzo-spiropyran
1,3,3-trimethylindolino-8'-bromo-benzo-spiropyran
1,3,3-trimethylindolino-8'-nitro-benzo-spiropyran
5-methoxy-1,3,3-trimethylindolino-8'-methoxy-spiropyran
5-methoxy-1,3,3-trimethylindolino-6'-chloro-spiropyran
5-methoxy-1,3,3-trimethylindolino-6'-bromo-benzo-spiropyran
5-bromo-1,3,3-trimethylindolino-6'-bromo-benzo-spiropyran
5-chloro-1,3,3-trimethylindolino-8'-methoxy-benzo-spiropyran
7-bromo-1,3,3-trimethylindolino-6'-methoxy-benzo-spiropyran and
5-phenyl-1,3,3-trimethylindolino-8'-methoxy-benzo-spiropyran in place of 1,3,3-trimethylindolino-β-naphtho-spiropyran, and using Nemethylol-p-chloro-benzamide, N-methylol-p-aminobenzamide and N-methylol-α-chloro-acetamide in place of N-methylolbenzamide in Example 23.

EXAMPLE 31

5.0 grams of phthalimidomethyl-1,3,3-tri-methylindolino-β-naphtho-spiropyran was dissolved in 140 grams of dichlorodiphenyl. The solution was added to 60 grams of 10.0 percent aqueous gelatin solution and dispersed as oil drops of about 5 microns to 10 microns in size with vigorous stirring. The emulsion was mixed with 60 grams of 10 aqueous gum arabic solution and adjusted the pH-value to 4.8 with acetic acid solution. Thus the coacervation with gelatin and gum arabic was finished. The wall around the droplet was then solidified by treating it with 15 grams of 30 percent formalin and a 10 percent sodium hydroxide solution was added to adjust the pH value to 9.0 on cooling. After stirring for 30 minutes, the obtained mixture was warmed at the speed of 1.0° C. per minute. The solidification was finished at 50° C. Thus obtained capsules were isolated by the decantation or filtration, then applied onto paper with proper carriers such as paste. The amount of the capsules applied was about 8.0 grams per m² of paper. When the paper was put upon a paper coated with an electron adsorbing material such as activated clay or kaolin and pressure was applied thereto, an orange red image of a high density was immediately obtained. The development time was short and the sublimation fastness and light fastness of the image were excellent.

EXAMPLE 32

5.0 grams of 3,4,5,6-tetrahydro-phthalimido-methyl-indolino-β-naphto-spiropyran was dissolved in 150 grams of olive oil. The solution was added to 60 grams of 10.0 percent aqueous gelatin solution and dispersed as oil drops of 3 microns to 5 microns in size with vigorous stirring. The emulsion was mixed with 60 grams of 10 percent agar solution and adjusted the pH-value to 4.5 with acetic acid. The drops coated by the coacervated layer of gelatin and agar were hardened with 30 grams of tannic acid or gallic acid. After solidification was ended, the obtained capsules were got with the decantation and applied onto paper. The pressure sensitive copy paper was obtained after dried. The amount of the capsules applied was about 8 grams per m² of the paper. When the paper was put upon a paper coated with an electron adsorbing material such as activated clay or kaolin and pressure was applied thereto, an orange red image of a high density was immediately obtained. The development time was short and the light fastness of the image was excellent.

EXAMPLE 33

0.1 gram of benzamidomethyl-1,3,3-trimethyl-indolino-6'-methoxy-benzospiropyran and 0.2 gram of terephthaloyl chloride were dissolved in 25 grams of dichlorodiphenyl. The above obtained solution was mixed with 200 g of 0.5 percent sodium bicarbonate solution and dispersed as oil drops of ca. 1 $\mu$ – 10 $\mu$ in size with vigorous stirring. Well stirring, the emulsion was mixed with 50 grams of 10 percent ethylene glycol. The surface polymerization of terephthaloyl chloride and ethylene glycol made the oil drops of the dye coated with the polyester film.

The capsules were isolated with the decantation, then applied onto paper with proper carriers such as paste. The amount of the capsules applied was about 8.0 grams per m² of paper. When the thus treated paper was put upon a paper coated with an electron adsorbing material such as activated clay or kaolin and pressure was applied thereto, a yellowish orange image of a high density was obtained. The development time was short and the light fastness of the image was excellent.

EXAMPLE 34

A solution of 4 g of chloroacetamido-methyl-1,3,3-trimethyl-indolino-7'-bromo-β-naphtho-spiropyran in 150 grams of chlorinated biphenyl was added to 60 grams of 10.0 percent aqueous gelatin solution and dispersed as oil drops of about 3 microns to 5 microns in size with vigorous stirring. The emulsion was mixed with 60 grams of 10.0 percent aqueous gum arabic solution and adjusted the pH-value to 4.8 with acetic acid. The wall around the droplet was then solidified by treating it with 15 grams of 30 percent formalin and a 10 percent sodium hydroxide solution was added to adjust the pH value to 9.0 on cooling. After stirring for 30 minutes the obtained mixture was warmed at the speed of 1.0° C per minute.

The solidification was finished at 50° C. Thus obtained capsules were isolated by the decantation, then applied onto paper with proper carriers such as paste. The amount of the capsules applied was about 8.0 grams per m² of paper. When the paper was put upon a surface coated with activated clay and pressure was applied thereto, an orange red image was produced.

EXAMPLE 35

Similar pressure sensitive copy papers were obtained by using the following compounds in place of benzamidomethyl-1,3,3-trimethylindolino-6'-methoxy-benzo-spiropyran or chloroacetamidomethyl-1,3,3-trimethyl-7'-bromo-β-naphtho-spiropyran in Example 33 or 34.

Amidomethyl and imidomethyl derivatives of the following compounds:

5-Methoxy-1,3,3-trimethylindolino-β-naphtho-spiropyran
5-Bromo-1,3,3-trimethylindolino-β-naphtho-spiropyran
5-Phenyl-1,3,3-trimethylindolino-β-naphtho-spiropyran
5-Nitro-1,3,3-trimethylindolino-β-naphtho-spiropyran
1,3,3,5-Tetramethylindolino-β-naphtho-spiropyran
1,3,3,7-Tetramethylindolino-β-naphtho-spiropyran
7-Bromo-1,3,3-trimethylindolino-β-naphtho-spiropyran
7-Methoxy-1,3,3-trimethylindolino-β-naphtho-spiropyran
7-Phenoxy-1,3,3-trimethylindolino-β-naphtho-spiropyran
7-Phenyl-1,3,3-trimethylindolino-β-naphtho-spiropyran
1,3,3-Trimethylindolino-7'-bromo-β-naphtho-spiropyran
1,3,3-Trimethylindolino-7'-nitro-β-naphtho-spiropyran
5-Methoxy-1,3,3-trimethylindolino-7'-chloro-β-naphtho-spiropyran
5-Methoxy-1,3,3-trimethylindolino-7'-bromo-β-naphtho-spiropyran
5-Methoxy-1,3,3-trimethylindolino-7'-methoxy-β-naphtho-spiropyran
5-Bromo-1,3,3-trimethylindolino-7'-chloro-β-naphtho-spiropyran
5-Bromo-1,3,3-trimethylindolino-7'-nitro-β-naphtho-spiropyran
5-Bromo-1,3,3-trimethylindolino-7'-methoxy-β-naphtho-spiropyran
5-Chloro-1,3,3-trimethylindolino-7'-bromo-β-naphtho-spiropyran
5-Chloro-1,3,3-trimethylindolino-7'-nitro-β-naphtho-spiropyran
5-Phenyl-1,3,3-trimethylindolino-7'-chloro-β-naphtho-spiropyran
5-Phenyl-1,3,3-trimethylindolino-7'-bromo-β-naphtho-spiropyran
5-Phenyl-1,3,3-trimethylindolino-7'-methoxy-β-naphtho-spiropyran
5-Nitro-1,3,3-trimethylindolino-7'-chloro-β-naphtho-spiropyran
5-Nitro-1,3,3-trimethylindolino-7'-nitro-β-naphtho-spiropyran
5-Nitro-1,3,3-trimethylindolino-7'-methoxy-β-naphtho-spiropyran
1,3,3,5-Tetramethylindolino-7'-bromo-β-naphtho-spiropyran
1,3,3,5-Tetramethylindolino-7'-nitro-β-naphtho-spiropyran 1,3,3,7-Tetramethylindolino-7'-chloro-β-naphtho-spiropyran
1,3,37-Tetramethylindolino-7'-bromo-β-naphtho-spiropyran
1,3,3,7-Tetramethylindolino-7'-methoxy-β-naphtho-spiropyran
7-Chloro-1,3,3-trimethylindolino-7'-chloro-β-naphtho-spiropyran
7-Chloro-1,3,3-trimethylindolino-7'-nitro-β-naphtho-spiropyran
7-Chloro-1,3,3-trimethylindolino-7'-methoxy-β-naphtho-spiropyran
7-Bromo-1,3,3-trimethylindolino-7'-bromo-β-naphtho-spiropyran
7-Bromo-1,3,3-trimethylindolino-7'-nitro-β-naphtho-spiropyran
7-Methoxy-1,3,3-trimethylindolino-7'-chloro-β-naphtho-spiropyran
7-Methoxy-1,3,3-trimethylindolino-7'-bromoβ-naphtho-spiropyran
7-Methoxy-1,3,3-trimethylindolino-7'-methoxy-β-naphtho-spiropyran
7-Nitro-1,3,3-trimethylindolino-7'-chloro-β-naphtho-spiropyran
7-Nitro-1,3,3-trimethylindolino-7'-nitro-β-naphtho-spiropyran
7-Nitro-1,3,3-trimethylindolino-7'-methoxy-β-naphtho-spiropyran
7-Phenoxy-1,3,3-trimethylindolino-7'-nitro-β-naphtho-spiropyran
7-Phenoxy-1,3,3-trimethylindolino-7'-bromo-β-naphtho-spiropyran
7-Phenyl-1,3,3-trimethylindolino-7'-chloro-β-naphtho-spiropyran
7-Phenyl-1,3,3-trimethylindolino-7'-bromo-β-naphtho-spiropyran
7-Phenyl-1,3,3-trimethylindolino-7'-nitro-β-naphtho-spiropyran
1,3,3-Trimethylindolino-benzo-spiropyran
5-Nitro-1,3,3-trimethylindolino-benzo-spiropyran
5-Phenyl-1,3,3-trimethylindolino-benzo-spiropyran
7-Bromo-1,3,3-trimethylindolino-benzo-spiropyran
1,3,3,5-Tetramethylindolino-benzo-spiropyran
1,3,3-Trimethylindolino-6'-chloro-benzo-spiropyran
1,3,3-Trimethylindolino-6'-nitro-benzo-spiropyran
1,3,3-Trimethylindolino-8'-chloro-benzo-spiropyran
5-Methoxy-1,3,3-trimethylindolino-6'-bromo-benzo-spiropyran
5-Methoxy-1,3,3-trimethylindolino-8'-nitro-benzo-spiropyran
5-Methoxy-1,3,3-trimethylindolino-8'-bromo-benzo-spiropyran
5-Chloro-1,3,3-trimethylindolino-6'-methoxy-benzo-spiropyran
5-Chloro-1,3,3-trimethylindolino-8'-methoxy-benzo-spiropyran
5-Nitro-1,3,3-trimethylindolino-6'-chloro-benzo-spiropyran
5-Nitro-1,3,3-trimethylindolino-6'-methoxy-benzo-spiropyran
5-Nitro-1,3,3-trimethylindolino-8'-bromo-benzo-spiropyran
5-Bromo-1,3,3-trimethylindolino-6'-chloro-benzo-spiropyran
5-Bromo-1,3,3-trimethylindolino-6'-nitro-benzo-spiropyran
5-Bromo-1,3,3-trimethylindolino-8'-chloro-benzo-spiropyran
5-Phenoxy-1,3,3-trimethylindolino-6'-chloro-benzo-spiropyran
5-Phenoxy-1,3,3-trimethylindolino-8'-nitro-benzo-spiropyran
5-Phenoxy-1,3,3-trimethylindolino-8'-bromo-benzo-spiropyran
5-Phenyl-1,3,3-trimethylindolino-6'-methoxy-benzo-spiropyran
5-Phenyl-1,3,3-trimethylindolino-8'-methoxy-benzo-spiropyran
7-Methoxy-1,3,3-trimethylindolino-6'-bromo-benzo-spiropyran
7-Methoxy-1,3,3-trimethylindolino-6'-nitro-benzo-spiropyran
7-Methoxy-1,3,3-trimethylindolino-8'-chloro-benzo-spiropyran
7-Chloro-1,3,3-trimethylindolino-6'-chloro-benzo-spiropyran
7-Chloro-1,3,3-trimethylindolino-8'-nitro-benzo-spiropyran
7-Chloro-1,3,3-trimethylindolino-8'-bromo-benzo-spiropyran
7-Bromo-1,3,3-trimethylindolino-6'--methoxy-benzo-spiropyran
7-Bromo-1,3,3-trimethylindolino-8'-methoxy-benzo-spiropyran
7-Phenoxy-1,3,3-trimethylindolino-6'-chloro-benzo-spiropyran
7-Phenoxy-1,3,3-trimethylindolino-6'-nitro-benzo-spiropyran
7-Phenoxy-1,3,3-trimethylindolino-8'-bromo-benzo-spiropyran
7-Phenyl-1,3,3-trimethylindolino-6'-chloro-benzo-spiropyran
7-Phenyl-1,3,3-trimethylindolino-8'-nitro-benzo-spiropyran
7-Phenyl-1,3,3-trimethylindolino-8'-chloro-benzo-spiropyran
1,3,3,5-Tetramethylindolino-6'-methoxy-benzo-spiropyran
1,3,3,5-Tetramethylindolino-8'-methoxy-benzo-spiropyran
1,3,3,7-Tetramethylindolino-6'-Chloro-benzo-spiropyran
1,3,3,7-Tetramethylindolino-6'-nitro-benzo-spiropyran
1,3,3,7-Tetramethylindolino-8'-chloro-benzo-spiropyran Also, similar pressure sensitive copy papers were obtained by using
phthalimidomethyl derivatives,
maleimidomethyl derivatives,
succinimidomethyl derivatives,
tetrahydrophthalimidomethyl derivatives,
formamidomethyl derivatives,
acetamidomethyl derivatives,
propionamidomethyl derivatives,
butyramidomethyl derivatives,
acrylamidomethyl derivatives,
benzoamidomethyl derivatives,
phenylacetamidomethyl derivatives, and
propionamidomethyl derivatives of the above-mentioned compounds.

EXAMPLE 36

4 Grams of 3,4,5,6-tetrahydrophthalimido-methyl-1,3,3,-trimethylindolino-7'-bromo-β-naphtho-spiropyran, 4 grams of 2methyl-5-methoxy-4-amino-4',4''-bis-(dimethylaminophenyl)-triphenylmethane and 3.0 grams of 2-tert.-butyl-4-methyl-6-diethyl-aminofluorane were dissolved in 160 grams of chlorinated diphenyl. The solution was added to 120 grams of a 11.0 percent gelatin sol and dispersed as oil drops of about 3 to 5 μ in size with vigorous stirring.

The emulsion was mixed with 120 grams of 10 percent aqueous gum arabic solution and adjusted the pH value to 4.8 with acetic acid. Thus the coacervation with gelatin and gum arabic was finished. The wall around the droplet was then solidified by treating it with 30 grams of 30 percent formalin and a 10 percent sodium hydroxide solution was added to adjust the pH value to 9.0 on cooling. After stirring for 30 minutes, the obtained mixture was warmed at the speed of 1.0° C. per minute. The solidification was finished at 50° C. Thus obtained capsules were isolated by the filtration, then applied onto paper to obtain pressure sensitive copy paper with proper carriers such as paste. The amount of capsules applied was about 8 grams per m². When the paper was put upon a paper coated with an electron absorbing material such as acid clay or bentonite and pressure was applied thereto by pencil or typewriter, a reddish black to black image was obtained.

EXAMPLE 37

2.0 Grams of phthalimidomethyl-1,3,3-trimethyl-indolino-7'-bromo-β-naphtho-spiropyran, 3.0 grams of 1,2-benz-6-diethylamino-fluorane, 3.0 grams of Crystal Violet lactone and 3.0 grams of benzoyl leuco Methylene Blue were dissolved in 240 grams of chlorinated biphenyl.

The emulsion was mixed with 150 grams of 10 percent aqueous gum arabic solution and adjusted the pH-value to 4.8 with acetic acid. Thus the coacervation with The wall around the droplet was then solidified by treating it with 45 grams of 30 percent formalin and a 10 percent sodium hydroxide solution was added to adjust the pH value to 9.0 on cooling. After stirring for 30 minutes, the obtained mixture was warmed at the speed of 1.0° C per minute. The solidification was finished at 50° C. Thus obtained capsules were isolated by the decantation, then applied onto paper to obtain pressure sensitive copy paper with proper carriers such as paste. The amount of capsules applied was 8.0 grams per m² of paper. When the paper was put upon a paper coated with an electron adsorbing material such as acid clay or bentonite and pressure was applied thereto, a black image was obtained.

What we claim is:
1. A compound of the formula,

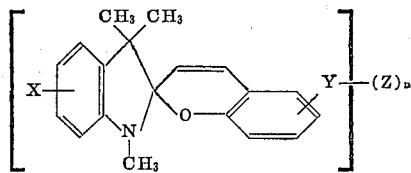

or

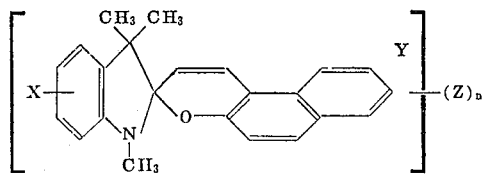

wherein X represents hydrogen, halogen, alkyl of 1-5 carbon atoms, alkoxy of one–five carbon atoms, phenoxy, phenyl, benzyl, or nitro; Y represents hydrogen, halogen, alkyl of one–five carbon atoms, alkoxy of one–five carbon atoms, phenyl, benzyl, or nitro; Z represents phthalimidomethyl or a substituted phthalimidomethyl group, tetrahydrophthalimidomethyl or a substituted tetrahydrophthalimidomethyl group (the substituents being amino, nitro, hydroxyl, alkyl of one–five carbon atoms or halogen); and $n$ in 1 to 2.

2. Phthalimidomethyl-1,3,3-trimethyl-indolino-β-naphtho-spiropyran.
3. 3,4,5,6-Tetrahydrophthalimidomethyl-1,3,3-trimethyl-indolino-β-naphtho-spiropyran.
4. Phthalimidomethyl-1,3,3-trimethyl-5-chloro-indolino-7'-bromo-β-naphtho-spiropyran.
5. Phthalimidomethyl-1,3,3-trimethylindolindolino-7'-bromo-β-naphtho-spiropyran.
6. 3,4,5,6-Tetrahydrophthalimido-methyl-1,3,3-trimethyl-5-chloro-indolino-β-naphtho-spiropyran.
7. 4-Methoxyphthalimidomethyl-1,3,3-trimethyl-5-chloro-indolino-β-naphtho-spiropyran.
8. 4-Chlorophthalimidomethyl-1,3,3-trimethylindolino-β-naphtho-spiropyran.
9. 3-Nitrophthalimidomethyl-1,3,3-trimethyl-5-nitro-indolino-7'-bromo-β-naphtho-spiropyran.
10. Phthalimidomethyl-1,3,3-trimethyl-5-methoxy-indolinoβ-naphtho-spiropyran.
11. Bis-(3,4,5,6-tetrahydrophthalimidomethyl) 1,3,3-trimethyl-5-methoxy-indolino-β-naphtho-spiropyran.

* * * * *